United States Patent [19]
Gomi

[11] Patent Number: 6,080,304
[45] Date of Patent: Jun. 27, 2000

[54] CLARIFYING DEVICE FOR USE IN AN AQUARIUM

[75] Inventor: Takeshi Gomi, Osaka, Japan

[73] Assignee: GEX Corporation, Osaka, Japan

[21] Appl. No.: 09/332,022

[22] Filed: Jun. 14, 1999

Related U.S. Application Data

[62] Division of application No. 09/031,189, Feb. 26, 1998, abandoned.

[30] Foreign Application Priority Data

| Feb. 27, 1997 | [JP] | Japan | 9-44015 |
| Sep. 1, 1997 | [JP] | Japan | 9-236230 |

[51] Int. Cl.$^7$ .................. C02F 3/02; A01K 63/04
[52] U.S. Cl. .................. 210/94; 210/151; 210/169; 210/263; 210/416.2; 119/260; 119/261
[58] Field of Search .................. 210/616, 619, 210/629, 94, 150, 151, 169, 220, 380.3, 381, 416.2, 263; 119/227, 259, 260, 261

[56] References Cited

U.S. PATENT DOCUMENTS

| 482,515 | 9/1892 | Blessing . | |
| 2,315,254 | 3/1943 | Fraser . | |
| 2,315,681 | 4/1943 | Weisgerber | 210/142 |
| 3,480,542 | 11/1969 | Bucksteeg et al. | 210/20 |
| 4,028,244 | 6/1977 | Holmberg . | |
| 4,211,183 | 7/1980 | Hoult | 119/3 |
| 4,333,893 | 6/1982 | Clyde . | |
| 4,547,286 | 10/1985 | Hsiung | 210/738 |
| 5,227,055 | 7/1993 | Timmons . | |
| 5,242,582 | 9/1993 | Marioni | 210/151 |
| 5,350,507 | 9/1994 | McManus . | |
| 5,423,978 | 6/1995 | Snyder et al. | 210/151 |
| 5,466,373 | 11/1995 | Handwerker et al. . | |
| 5,527,455 | 6/1996 | Hoffa | 210/169 |
| 5,558,042 | 9/1996 | Bradley et al. . | |
| 5,618,431 | 4/1997 | Kondo et al. | 210/618 |
| 5,626,761 | 5/1997 | Howery et al. | 210/651 |
| 5,647,983 | 7/1997 | Limcaco . | |
| 5,672,268 | 9/1997 | Mizrahi et al. | 210/110 |
| 5,705,057 | 1/1998 | Hoffa | 210/150 |
| 5,723,043 | 3/1998 | Hawk et al. | 210/108 |
| 5,747,311 | 5/1998 | Jewell | 435/176 |
| 5,755,961 | 5/1998 | Limcaco . | |

FOREIGN PATENT DOCUMENTS

| 0 504 597 | 9/1992 | European Pat. Off. . |
| 1-171694 | 7/1988 | Japan . |
| 6-261653 | 9/1994 | Japan . |

*Primary Examiner*—David A. Simmons
*Assistant Examiner*—Fred Prince
*Attorney, Agent, or Firm*—Armstrong, Westerman, Hattori, McLeland & Naughton

[57] ABSTRACT

A clarifying device for use in an aquarium that includes a casing having at least one transparent portion. A plurality of clarifying pieces are confined in the casing. Each piece has a bulk density of from 0.7 to 1.3. When aquarium water flows through the casing, the clarify pieces flow in the casing and clarify the aquarium water.

6 Claims, 15 Drawing Sheets

FIG.5 FIG.6
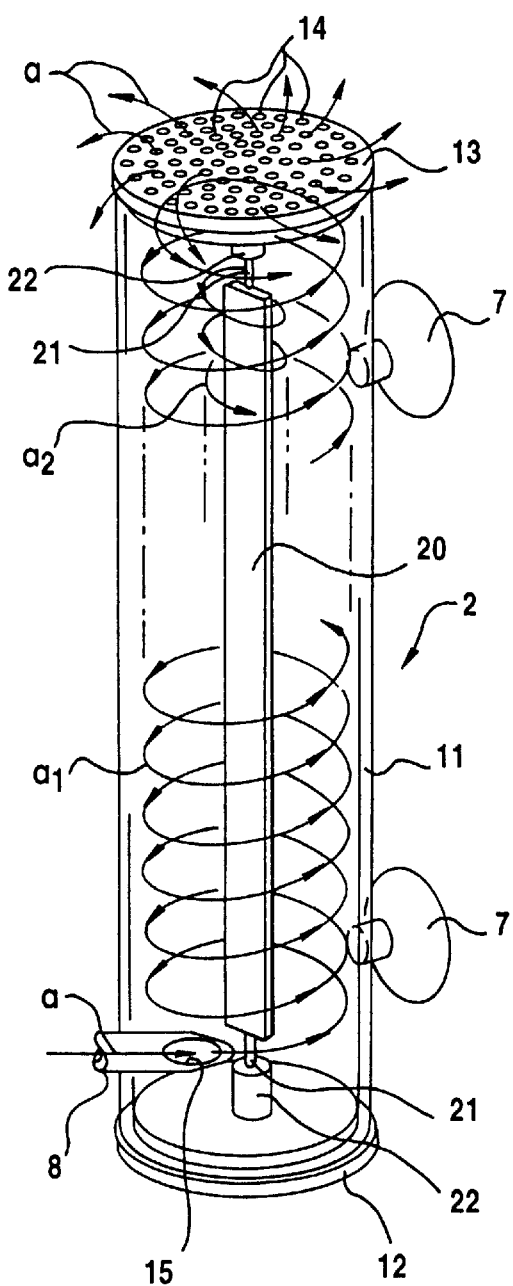
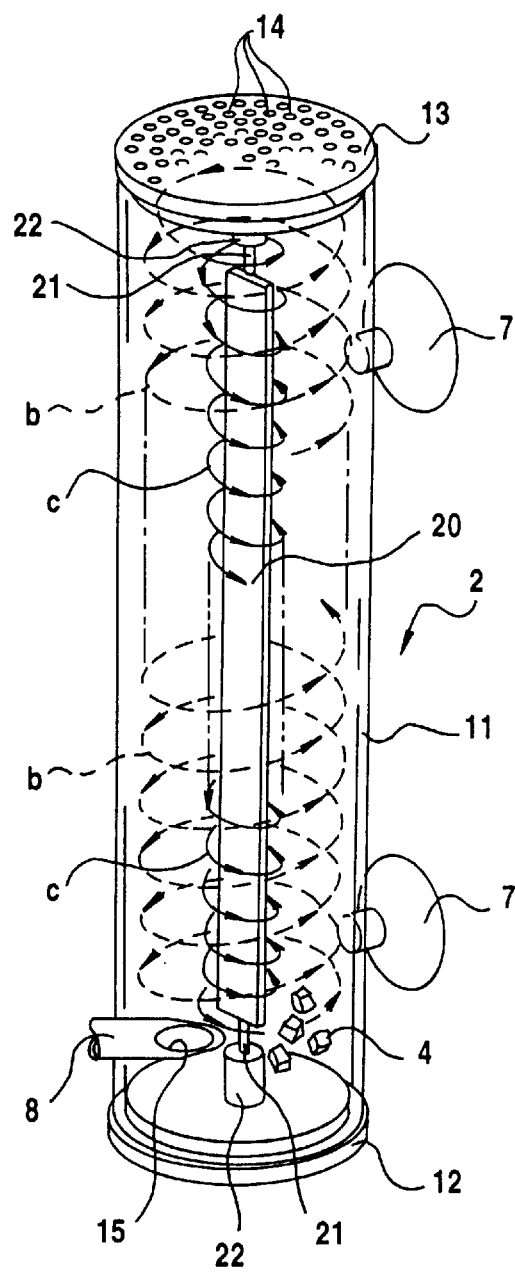

CLARIFYING DEVICE FOR USE IN AN AQUARIUM

This application is a division of application Ser. No. 09/031,189, filed Feb. 26, 1998 now abandoned.

BACKGROUND OF THE INVENTION

1. Field of the Invention

The present invention relates to a clarifying device for use in an aquarium.

2. Description of the Related Art

As a clarifying device for use in an aquarium, a bottom-dispose-type clarifying device which is disposed on a bottom of an aquarium, an upper-dispose-type clarifying device which is disposed on an upper part of an aquarium, and an outer-dispose-type clarifying device which is disposed on an outer surface of a wall of an aquarium, are known. In conventional clarifying devices, clarifying materials are fixedly disposed therein to biochemically clarify water in an aquarium.

In a conventional clarifying device, however, since water in an aquarium is biochemically purified when passed through clarifying materials fixedly accommodated in the device, the water does not sufficiently contact the clarifying materials, resulting in low clarifying efficiency.

In a conventional bottom-dispose-type clarifying device, the device often clogs, which causes an insufficient water clarification. This requires a replacement of the clarifying materials in a relatively short period.

A timing for changing clarifying materials is generally decided by a decreased degree of flow amount of the clarified water passing through the clarifying device. However, the user's memory of an initial water flow amount, which is a water flow amount passing through newly placed clarifying materials, becomes vague as time passes after the replacement of the clarifying materials. Therefore, it is not easy to compare the decreased water flow amount with the initial water flow amount. As a result, it is difficult to find a correct timing for changing the clarifying materials.

SUMMARY OF THE INVENTION

It is therefore an object of the present invention to provide a clarifying device for use in an aquarium which solves the above-mentioned problems, and which has a good clarifying efficiency, no clogging and is low in price.

It is an additional object of the invention to provide a clarifying device for use in an aquarium wherein the user can easily find an appropriate timing for replacing the clarifying materials.

According to the present invention, there is provided a clarifying device for use in an aquarium that comprises a casing having at least one transparent portion, and a plurality of clarifying pieces disposed in the casing. Each piece has a bulk density of from 0.7 to 1.3. The casing includes a water inlet for introducing aquarium water and a water outlet for discharging clarified water. The clarifying pieces flow in the casing by water flowing from the water inlet toward the water outlet.

In the clarifying device, because the clarifying pieces flow in accordance with water flow in the casing, the contact efficiency between the aquarium water and the clarifying pieces is fine, resulting in good clarifying efficiency. Further, the clarifying pieces always flow—clogs which often occur in a conventional bottom-dispose-type clarifying device do not occur. Therefore, a flow amount of the clarified water passing through the clarifying device does not decrease, and a constant flow amount thereof can be obtained. Further, because interesting movements of the clarifying pieces can be observed through the transparent portion of the clarifying casing, the decorative performance thereof is enhanced.

Furthermore, because the clarifying pieces circulate in the casing, microorganisms can be carried thereon in a short time period. Thus, shortly after beginning use of the clarifying device, the clarifying device demonstrates its superior performance. In addition, the device can be manufactured with a simple structure and with a low price.

It is preferable that the clarifying piece changes the surface color with time when used. In this case, the user can determine the appropriate timing for replacing the clarifying pieces by observing a change in the color of the clarifying pieces through the transparent portion of the casing.

The clarifying piece may each preferably be a porous cellulosic piece. In this case, the user can find the appropriate timing for replacing the clarifying pieces by observing a change in the color of the clarifying pieces through the transparent portion of the casing because the porous cellulosic pieces change in surface color from an original white color to a red-brown color. Because a cellulose is cross-linked, a short-term cellulose resolution can be reduced or prevented, resulting in superior durability. Further, because superior microorganism carrying performance, which is inherent in a cellulose, can be maintained, clarifying efficiency can be further enhanced.

The clarifying piece may preferably be a porous cellulosic piece coated by compounds obtained by reacting epoxy compounds on polyamine compounds. Because a larger amount of microorganisms can be carried on the clarifying pieces due to positive charges of the compounds obtained by reacting epoxy compounds on polyamine compounds, clarifying efficiency can be further improved. Coating the porous cellulosic by the reacted compounds can avoid microorganism contact with the cellulosic, thereby preventing a resolution of cellulosic due to the enzyme.

The clarifying piece may preferably be a porous cellulose piece coated by compounds obtained by reacting epoxy compounds on polyamine compounds. In this case, the user can find an appropriate timing for changing the clarifying pieces by observing the changes in the color of the clarifying pieces through the transparent portion of the casing because the porous cellulosic changes in surface color from its original white color to a red-brown color. Because a larger amount of microorganisms can be carried on the clarifying pieces because of positive charges of the reacted compounds, clarifying efficiency can be further improved. Further, because the porous cellulose is coated by the reacted compounds, a resolution of the cellulosic due to the enzyme can be avoided, resulting in high endurance of the clarifying pieces. In addition, because cellulose is a natural material, disposal of the clarifying pieces does not cause environmental problems.

The clarifying device may further include a water flow causing means for causing water to flow from the water inlet toward the water outlet.

The water outlet may preferably be formed apart from the water inlet. The water outlet formed apart from the water inlet increases the water flow distance in the casing, which increases the contact efficiency between the aquarium water and the clarifying pieces, resulting in further improved clarifying efficiency.

It is preferable that the casing is in the cylindrical form, and a direction of the water inlet coincides with a direction of a tangent to a peripheral wall of the casing, whereby aquarium water injected from the water inlet spirals up around an axis of the casing from the water inlet toward the water outlet. In this case, the aquarium water spirals up in the casing together with the clarifying pieces from the water inlet toward the water outlet. Therefore, the spiral flow distance becomes very long and thus the contacting efficiency between the clarifying pieces and aquarium water also becomes very high, whereby the contacting efficiency between the clarifying pieces and the aquarium water also becomes very high, resulting in further improved clarifying efficiency. In addition, because this construction does not require a large casing, the clarifying device can be small in size while keeping a high clarifying efficiency.

The clarifying device may further comprise a rotary member rotatably provided along an axis of the casing. In this case, the rotating plate rotates about the axis of the casing in accordance with the spiral flow of the aquarium water and the clarifying pieces. The rotation of the rotating plate enables steady spiral flow of the aquarium water and the clarifying pieces about the axis of the casing, which prevents the disturbance of the flow even when the clarifying pieces contact or collide with each other. Thus, a steady spiral flow of the aquarium water and the clarifying pieces can be obtained, thereby resulting in further improved clarifying efficiency.

It is preferable that the water flow causing means is a submersible pump. When a submersible pump is employed as the water flow causing means, not only a stable clarifying efficiency can be obtained due to the stable and strong pumping ability, but also the whole clarifying device can be installed in an aquarium, which does not require additional space in or out of an aquarium for installing the clarifying device. Thus, the clarifying device can be used in any type of aquarium.

It is preferable that the water inlet is connected to the water flow causing means by way of a pipe, and that the water outlet is connected to a returning pipe for returning clarified water in the aquarium. In this case, because the aquarium water is introduced in the clarifying device and then returned into an aquarium, the clarifying device can be disposed outside an aquarium, which does not decrease any observing space or area in the aquarium. Thus, it is preferable to use in a small aquarium that requires keeping observing space or area as large as possible or wherein it is impossible to dispose the clarifying device therein.

It is preferable that the clarifying device further comprises a filter, whereby the aquarium water is introduced into the casing after passing through the filter. In this case, both biological clarifying and physical filtering effects can be obtained.

It is preferable that the clarifying device further comprises a rotational driving means, wherein the casing is in cylindrical form and includes a pair of side walls disposed at a certain distance and a peripheral wall, and wherein the water inlet is formed on at least one of the side walls and the water outlet is formed on the peripheral wall so as to cause the water flow in accordance with the rotation of the casing. Water outlets formed apart from the rotational center increase the amount of clarified water from the water outlet, resulting in further improved clarifying efficiency.

The water outlet may be formed in the shape of slit and parallel to an axial direction of the casing. The Slit-shaped water outlet decreases water outlet resistance and the slit is perpendicular to the direction of the main water flow. Therefore, the clarified water can flow out of the casing through the water outlet with a high efficiency, resulting in an improved clarifying efficiency.

The peripheral wall may be provided with a plurality of outwardly protruding ribs each formed along near one edge of each water outlet, the edge being located at a forward direction of rotation, and also provided with a plurality of inwardly protruding ribs each formed along near the other edge of each water outlet, the edge being located at a rearward direction of rotation. This enhances the water flow from inside toward outside of the casing, resulting in a superior clarifying efficiency.

The clarifying device may further comprise at least one stirring piece having a bulk density of 1.4 or more, the stirring piece being disposed in the casing. The stirring pieces irregularly move in the clarifying casing when the casing rotates and repeatedly collide with the clarifying pieces. This prevents the clarifying pieces from piling up in the casing, thereby resulting in an improved clarifying efficiency.

The rotational driving means may include a rotor having a circular side wall and a plurality of radially extending wings, and a rotor covering body, and the rotor covering body may be provided with an air inlet opening for introducing air at a lower portion of a peripheral wall of the rotor covering body and an air outlet opening for emitting air at an upper portion of a peripheral wall the rotor covering body, whereby buoyancy of air pushes the outer wing portions upward, which in turn rotates the rotor, causing a rotation of the casing. Because the buoyancy of air is used as a rotational driving power, air used for the aeration mechanism which supplies oxygen into the aquarium water can also be used as the rotational driving power, which eliminates additional driving power, resulting in low running cost. Further, interesting movements of the clarifying pieces can be observed through the transparent portion of the clarifying casing, which enhances the decorative performance thereof.

It is preferable that the clarifying device further comprises a stand for supporting the rotor covering body, wherein the stand is provided with a water inlet and a filtering space communicating the water inlet with the air inlet opening, and wherein physical filtering materials are disposed in the filtering space:

further comprising an upright passage having both ends, one end communicating with the filtering space near the air inlet opening, the other end opened at a higher portion communicating with the filtering space, an air introduction pipe having two ends, one end opening outside, the other end opening as air emitting apertures at a portion lower than the air inlet opening, whereby air emitted from the air emitting apertures is introduced in the air inlet opening and is also introduced in the upright passage to go up the air along the upright passage, which in turn introduces aquarium water into the filtering space. The upright passage enables buoyancy of air not only to rotate the clarifying casing but also to introduce the aquarium water into the filtering space, which enables aeration air to simultaneously perform physical filtering of the aquarium water and biological clarifying of the aquarium water.

It is preferable that the clarifying device for use in an aquarium includes a plurality of radially extending inner wing portions are formed inside the cylindrical wall, an outlet opening and an inlet opening are formed on the side wall so as to locate inside the cylindrical wall, and a water flow passage is formed adjacent to the upright passage with one end communicating to the inlet opening and the other end communicating to the filtering space.

In this case, in accordance with the rotation of the rotor, the aquarium water flows from the inlet opening toward the outlet opening by way of the inner chambers, which causes the aquarium water to be introduced into the filtering space through the slit-shaped water inlets. This enhances an introduction of the aquarium water into the filtering space, resulting in a superior physical filtering efficiency.

Other objects and features will be apparent from the following detailed description of the invention with reference to the attached drawings.

BRIEF DESCRIPTION OF THE DRAWINGS

The present invention will be more fully described and better understood from the following description, taken with the appended drawings, in which:

FIGS. 1 to 7 show a first embodiment of a clarifying device for use in an aquarium according to the present invention;

FIG. 2 is a cross-sectional view taken along the line B—B in FIG. 1A;

FIG. 3 is a perspective view showing the clarifying device mounted in an aquarium;

FIG. 4 is a perspective view showing the clarifying 'device in operation;

FIG. 5 is an explanately view showing a flow movement of water in the clarifying device shown in FIG. 4;

FIG. 6 is an explanately view showing a flow movement of the clarifying materials in the clarifying device shown in FIG. 4;

FIG. 7 is a perspective view showing the clarifying device in operation mounted outside an aquarium;

FIGS. 8 to 18 show a second embodiment of the clarifying device for use in an aquarium according to the present invention;

FIG. 8 is a perspective view showing the clarifying device;

FIG. 9 is a perspective view showing the clarifying device in a disassembled state;

FIG. 10 is a perspective view showing a rotating body of the clarifying device in a disassembled state;

FIG. 14 is a front view of a fixing pin;

FIG. 15 is a perspective view showing the clarifying device in operation which is mounted in an aquarium;

FIG. 16 is a perspective view showing the clarifying device in operation;

FIG. 17 is a left side view showing the clarifying device with a air flow shown in arrows.

DETAILED DESCRIPTION OF THE PREFERRED EMBODIMENTS

Figure 1A:
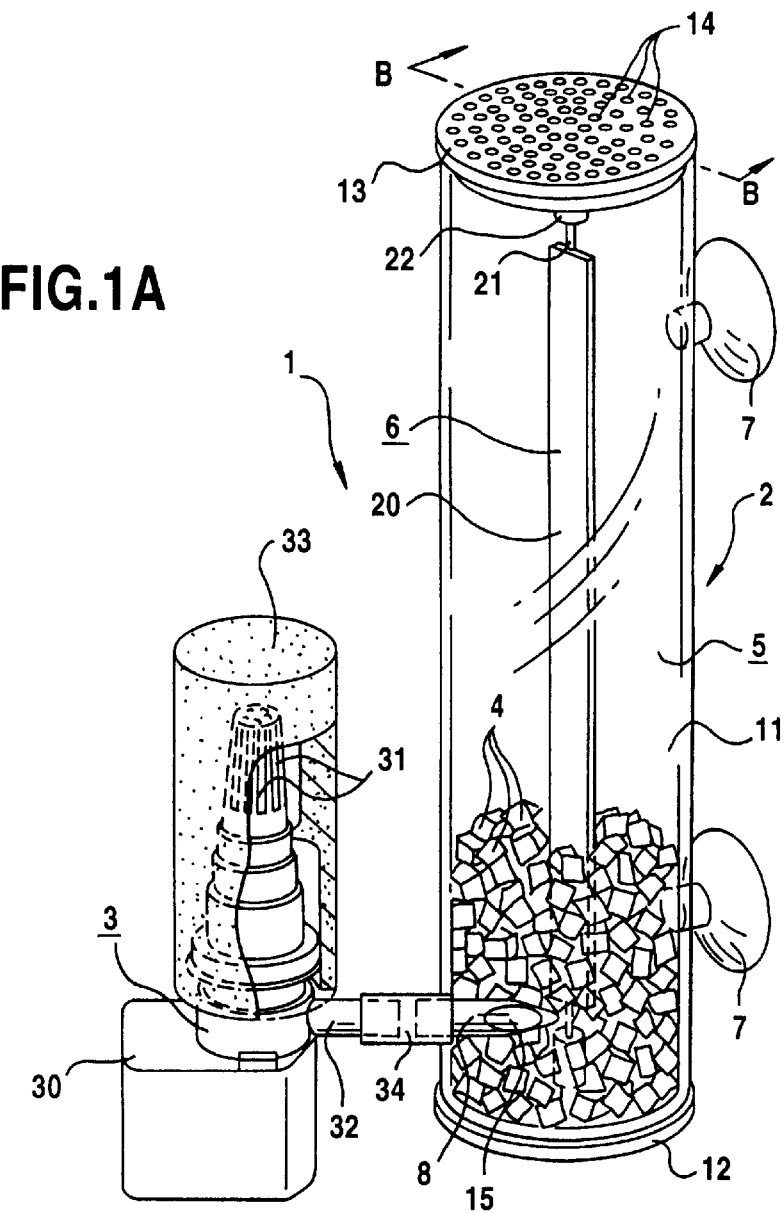
FIG. 1A is a perspective view showing the clarifying device.

Preferred embodiments of the present invention will now be described, in detail, with reference to the accompanying drawings. Like reference numerals in the drawings depict like embodiments.

First embodiment:

FIG. 1 shows a clarifying device for use in an aquarium according to the present invention. Reference numerals 2 to 4 denote a main body, a water flow causing means, and clarifying pieces, respectively.

The main body 2 includes a casing 5, a rotary plate 6, a pair of fixing members 7 and a water inlet pipe 8.

Figure 4:
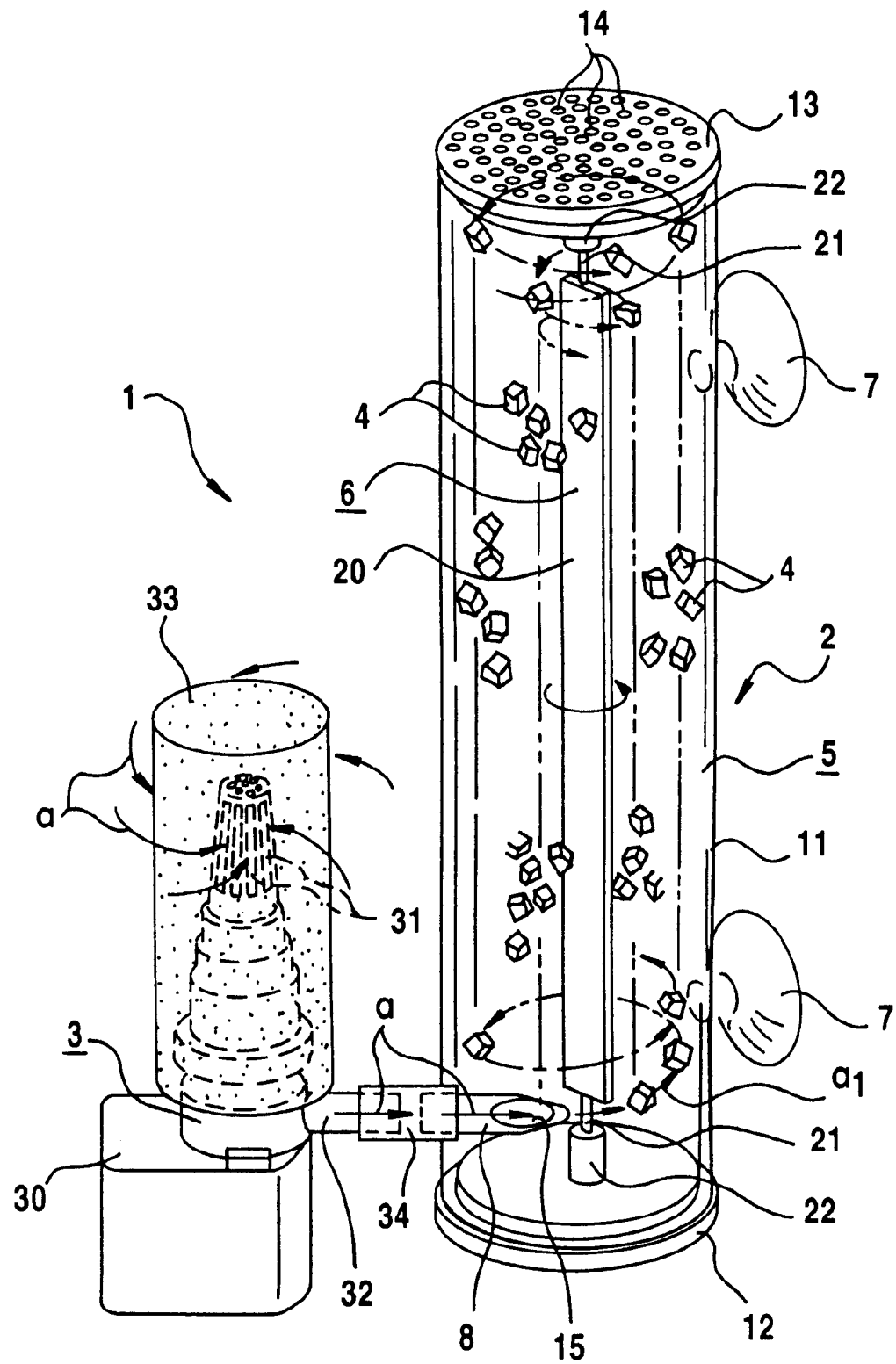

The casing 5 is of a cylindrical shape, and includes a bottom wall 12, a top wall 13 and a transparent peripheral wall 11. The top wall 13 is detachably attached to the upper opening of the peripheral wall 11 so that the clarifying pieces 4 can be replaced. The top wall 13 is provided with a plurality of water outlet apertures 14, and the peripheral wall 11 has, at the lower side portion, a water inlet port 15. The apertures 14 are designed to have a diameter smaller than a diameter of the clarifying pieces so as not to cause the clarifying pieces 4 to flow out of the casing 5. The water inlet pipe 8 is connected to the water inlet port 15 such that a direction of an axis of the water inlet pipe 8 coincides with a direction tangent to a peripheral wall 11. Therefore, as shown in FIG. 4, when the aquarium water W is injected from the water inlet port 15 into the casing 5 via the water inlet pipe 8, the injected aquarium water W flows along the inner surface of the peripheral wall 11, i.e., spirals up in the casing 5 as shown by the arrow a1.

Figure 3:
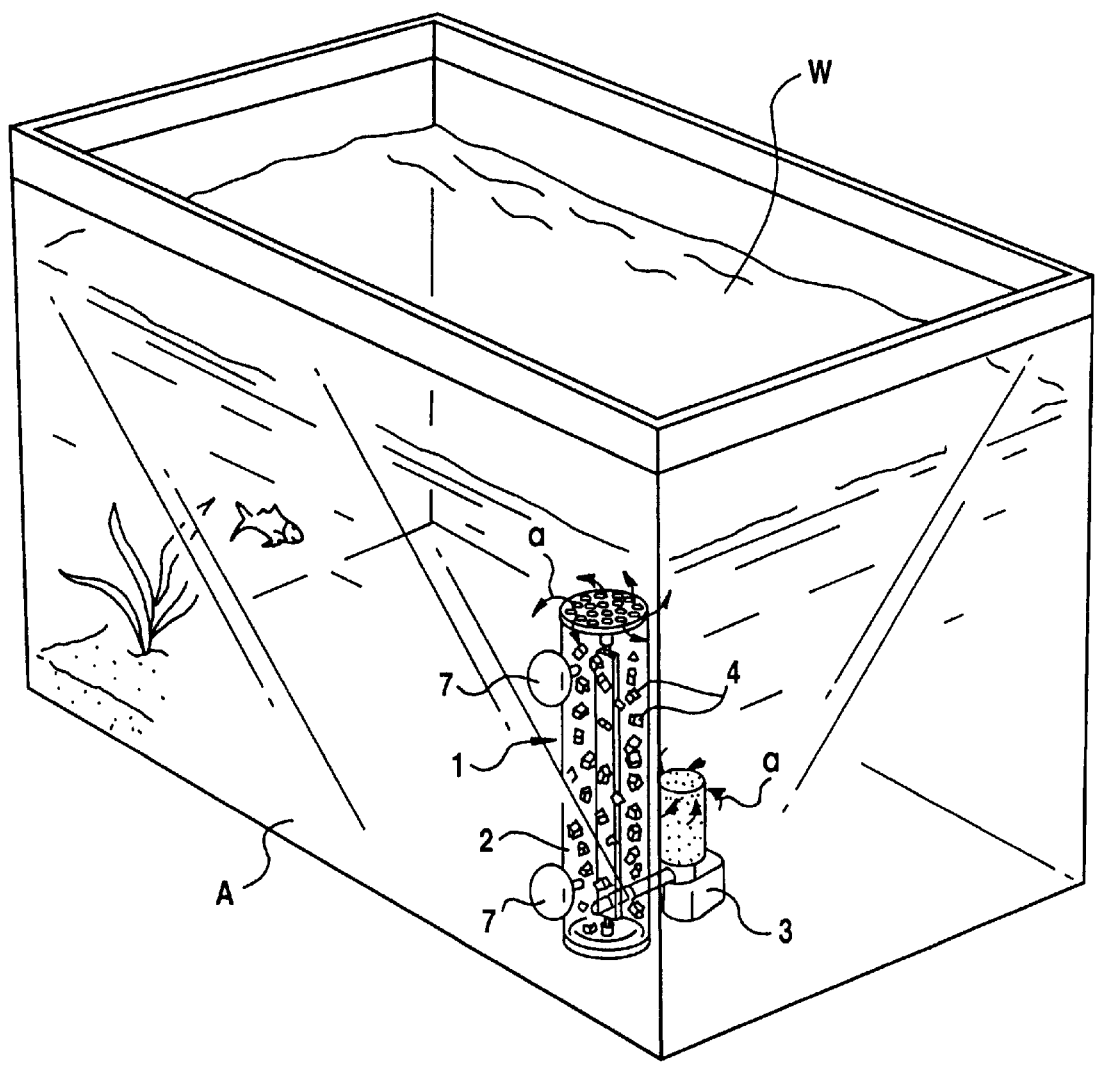

A pair of fixing members 7, i.e., suckers, is attached to upper and lower portions of the peripheral wall 11 such that the line connecting both of the fixing members 7 is parallel with the axis of the casing 5. As shown in FIG. 3, the fixing members 7 enable the clarifying device 1 to be used in an aquarium A to be fixed to the inner surface of the aquarium A. The device 1 may also be fixed to the bottom surface of an aquarium A.

Figure 2:
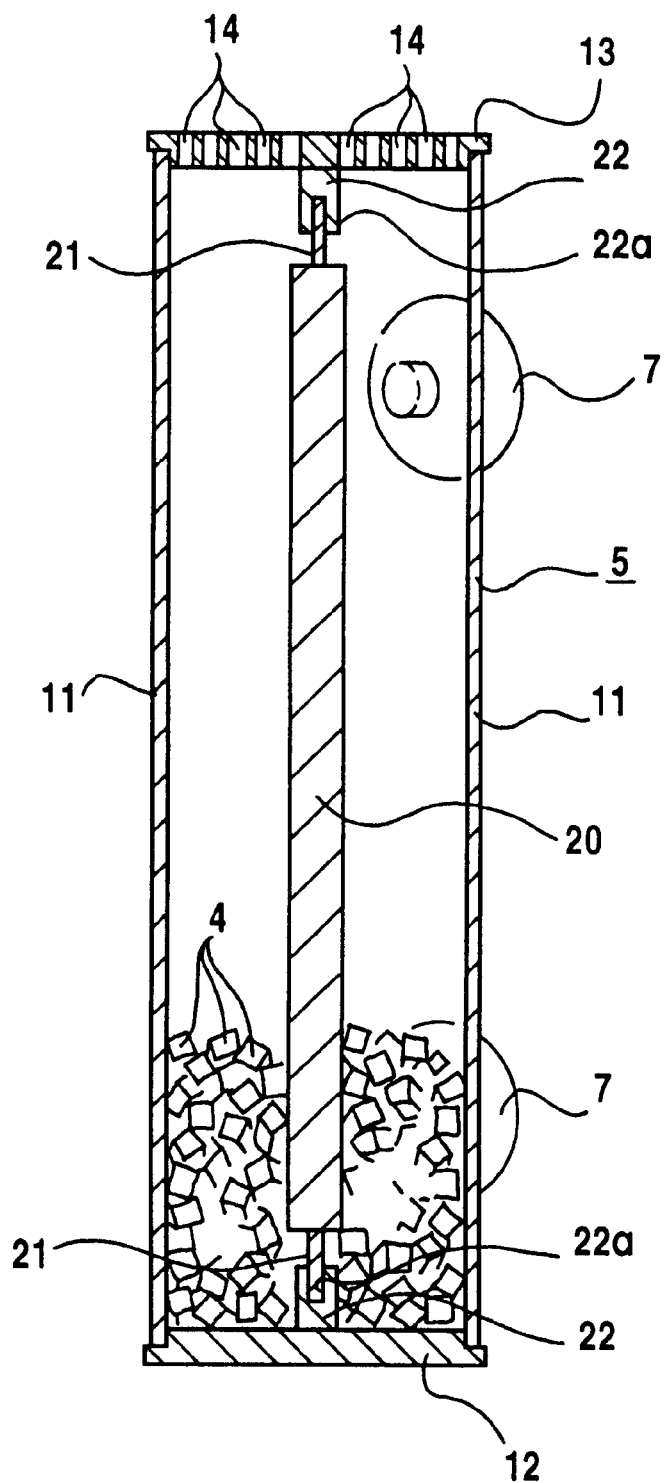

As shown in FIG. 2, the casing 5 is provided with a rotary member 6 which is disposed along the axis of the casing 5. In detail, the rotary member 6 includes a long rectangular plate 20 with column-shaped shafts 21 attached on both ends of the plate 20. The rotary member 6 is supported in the casing 5 along the axis thereof with the shafts 21 fitted in corresponding dented portions 22a of a bearing members 22 which are attached to inner central portions of the bottom wall 12 and the top wall 13, respectively. Thus, the rotating plate 20 can rotate about the axis of the casing 5.

In the casing 5, a plurality of clarifying pieces 4 are confined. Because the clarifying pieces 4 must circulate in the casing 5 in accordance with the water flow caused by the water flow causing means 3, the bulk density of the clarifying pieces 4 must fall with in a range of from 0.7 to 1.3, more preferably from 0.8 to 1.2.

Microorganisms carried on the clarifying pieces 4 clarify the aquarium water W by resolving organic substances such as excrement or leftover foods contained in aquarium water.

The amount of clarifying pieces 4 is preferably from 5 to 40 volume percent (volume E) to the inner volume of the casing 5. If the amount is below 5 volume %, clarifying efficiency is low. On the other hand, if the amount exceeds 40 volume %, the clarifying pieces 4 often contact each other, which impedes a smooth spiral flow of the clarifying pieces 4 and the aquarium water W, resulting in low clarifying efficiency. The amount of the clarifying pieces 4 is more preferably from 10 to 35 volume %.

Though the diameter of each clarifying piece 4 is preferably from 1 to 8 mm, the diameter is not limited to the above in the present invention. Further, the shape or configuration of each clarifying piece 4 is not limited. The clarifying pieces 4 may be spherical, cubic, rectangular, or any other shape.

The water flow causing means 3, which causes a water flow from the water inlet port 15 towards the water outlet apertures 14, is not limited to a specific means as long as the water flow causing means 3 can introduce aquarium water W into the casing 5 through the water inlet port 15, in other words, as long as the water flow causing means 3 can cause the clarified water to flow out of the casing 5 through the water outlet apertures 14. For example, an aeration means such as a submersible pump, an airlift pump, or the like, or an agitating means such as an impeller or an agitating plate rotated by a driving means such as a motor, or a magnetic agitating impeller rotated by a magnetic agitating machine, may be used as the water flow causing means 3. Preferably, a submersible pump may be used. When a submersible pump is employed as the water flow causing means 3, not only a stable clarifying efficiency can be obtained due to the stable and strong pumping ability, but also the whole clarifying device can be installed in an aquarium, which does not require additional space in or out of the aquarium for installing the clarifying device. In this embodiment, a submersible pump is employed as the water flow causing means 3.

Figure 1B:
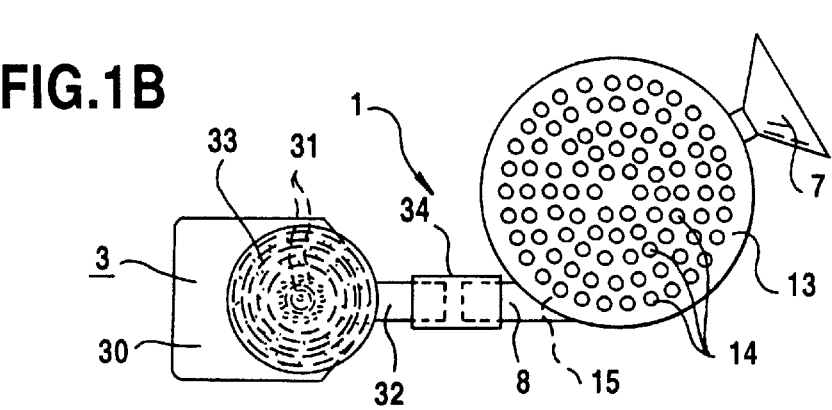
FIG. 1B is a top view thereof.

As shown in FIGS. 1A and 1B, the water flow causing means 3 includes a pump body 30, a filter 33 and a connecting pipe 34.

A conventional submersible pump is used for the pump body 30. The pump body 30 has a water inlet portion 31 which is covered by a filter 33 made of open-cell foam. The filter 33 prevents a fish from being sucked in the water inlet portion 31. The pump body 30 has an outlet port 32. One end of the outlet port 32 is connected to one end of the connecting pipe 34, and the other end of the connecting pipe 34 is connected to the water inlet pipe 8.

In such a case that the clarifying device 1 is attached in an aquarium A as shown in FIG. 3, when the water flow causing means 3 is driven, water W in the aquarium A is sucked into the water inlet portion 31 of the pump body 30 by way of the filter 33 as shown in FIG. 4. Then, the water W is passed through the outlet port 32, the connecting pipe 34 and the water inlet pipe 8, and is then introduced into the casing 5 through the water inlet port 15 of the casing 5. Thus, introduced water W flows along the inner surface of the peripheral wall 11 of the casing 5 because the water inlet pipe 8 is connected to the water inlet port 15 such that a direction of an axis of the water inlet pipe 8 coincides with a direction of a tangent to a peripheral wall 11. Because the aquarium water W is consecutively introduced from the water inlet port 15, as shown by an arrow al in FIG. 5, the introduced aquarium water W spirals up about the axis of the casing 5 from the water inlet port 15 towards the water outlet apertures 14. Most of the aquarium water W flows out through the water outlet apertures 14, but some of the aquarium water W spirals down towards the bottom of the casing 5 as shown by an arrow a2 in FIG. 5.

In accordance with the spiral aquarium water flow, as shown by the dotted-lines b in FIG. 6, the clarifying pieces 4 also spiral up in the casing 5. Because the whole length of the spiral flow becomes very longs the contacting efficiency between the clarifying pieces 4 and aquarium water W also becomes very high, whereby the contacting efficiency between microorganisms carried on the clarifying pieces 4 and aquarium water W also becomes very high. Thus, the clarifying efficiency will be further improved.

After the clarifying pieces 4 spiral up in the casing 5 towards the water inlet port 15 together with aquarium water W as shown by the dotted-lines b in FIG. 6, the clarifying pieces 4 can not flow out through the water inlet apertures 14 because the clarifying pieces 4 are larger than the diameter of the water outlet aperture 14. Therefore, the clarifying pieces 4 then spiral down toward the bottom of the casing 5 as shown by the sold line c in FIG. 6. Thereafter, the clarifying pieces 4 spiral up again toward the water inlet apertures 14 together with the aquarium water W which is newly introduced from the water inlet port 15.

As described above, in the clarifying device 1 according to the preferred embodiment, since the rotating plate 20 is rotatably provided in the casing 5, the rotating plate 20 rotates about the axis of the casing 5 in accordance with the spiral flow of the aquarium water W and the clarifying pieces 4. The rotation of the rotating plate 20 enables a steady spiral flow of the aquarium water W and the clarifying pieces 4 about the axis of the casing 4, which prevents a disturbance of the flow even when the clarifying pieces 4 contact or collide with each other. Thus, a steady spiral flow of the aquarium water W and the clarifying pieces 4 can be obtained, thereby resulting in a further improved clarifying efficiency.

Figure 7:
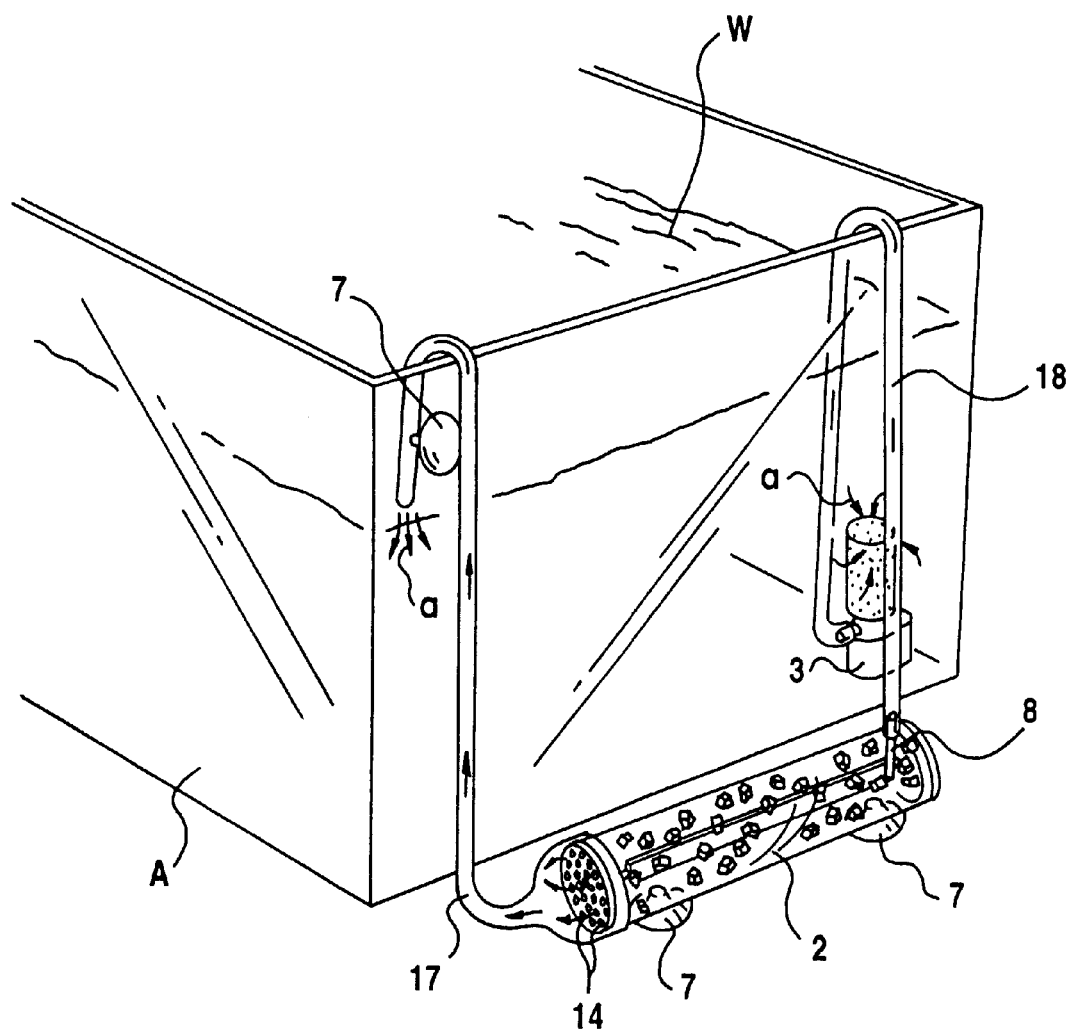

In the present embodiment, though the whole clarifying device 1 is placed under water in the aquarium A, the present invention is not limited to the above. The clarifying device 1 may be set up in the aquarium A such that the upper portion of the device 1 is located above the water level. Alternatively, the device 1 may be disposed on the upper portion of the aquarium A, or may be fixed on the outer surface of the aquarium A, or may be disposed outside the aquarium A. In these cases, pipes for introducing aquarium water W and for discharging aquarium water W from the water outlet apertures 14 will be required. For example, in the embodiment shown in FIG. 7, the clarifying device 1 is disposed outside the aquarium A. The water inlet pipe 8 is connected to the water flow causing means 3 by way of a water introducing pipe 18 which introduces aquarium water W into the clarifying device 1. One end of the water introducing pipe 18 is connected to the water inlet pipe 8, and the other end thereof is connected to the water flow causing means 3. The water outlet apertures 14 are connected to an enlarged end of a water returning pipe 17. The other end of the water returning pipe 17 is disposed above the water level or under water. Thus, a circulation flow path is formed.

Because the clarifying device for use in an aquarium according to the present invention is designed to clarify aquarium water W by utilizing microorganisms which are carried on the clarifying pieces 4 and resolve organic substances such as excrement or leftover food contained in the aquarium water W, the clarifying pieces 4 are not specifically limited as long as they can carry microorganisms. As a clarifying piece 14, an active carbon piece, a polyurethane foamed piece, an inorganic porous piece, a porous cellulosic piece, a porous cellulosic or cellulose piece coated by compounds obtained by reacting epoxy compounds on polyamine compounds, may be used. Among them, a piece which changes the surface color with time when used, such as a porous cellulosic piece, or a porous cellulosic or cellulose piece coated by compounds obtained by reacting epoxy compounds and polyamine compounds, may be preferably used. By using such a piece, the user can easily and exactly know the exchanging timing by observing color changes.

It is not required that microorganisms be carried on the clarifying piece 4 in advance because microorganisms will be carried on the clarifying piece 4 soon after the use of the clarifying device 1 begins.

The porous cellulosic is a cellulose cross-linked in a molecule and/or between molecules by compounds having a functional group which can react on hydroxyl group of glucose composing a cellulose. By cross-linking a cellulose, superior microorganism carrying performance, which is inherent in a cellulose, can be maintained, and a short-term cellulose resolution by an enzyme, which resolves a cellulose, can be reduced or prevented.

As for compounds with a functional group which reacts on hydroxyl group of the above glucose, compounds with epoxy group, N-methylol compounds, imidazolydinoin compounds, compounds with aldehyde group, acetal compounds, active vinyl compounds, aziridinyl compounds, compounds with carboxyl group, compounds with acyl group, compounds with isocyanate group, quaternary ammonium compounds, amide-phosphazene compounds, and the like, can be used. Each of the above compounds may be individually reacted on cellulose, and two or more of the above compounds may be jointly reacted on cellulose.

It is preferable that compounds with a functional group which reacts on a hydroxyl group of the above glucose, react on cellulose by 3 to 60 wt % to the cellulose. If the amount of the compounds is below 3 wt %, cross-linking of the cellulose becomes insufficient, which causes an excess resolution of the cellulose by the microorganism, resulting in a short life. On the other hand, if the amount of the compounds exceeds 60 wt %, superior microorganism carrying performance, which is inherent in a cellulose, can be spoiled.

Commercially available porous cellulosic is not specifically limited. For example, AKUASERU FZ-B (Brand name) made by KABUSHIKI KAISHA BIOMATERIAL, may be used.

The porous cellulosic or cellulose may preferably be coated with a compound obtained by reacting epoxy compounds and amine compounds. This can avoid a microorganisms's enzyme, which resolves a cellulose, coming into contact with cellulosic or cellulose, whereby preventing a resolution of cellulosic or cellulose due to the enzyme. Because a larger amount of microorganisms can be carried on the clarifying pieces because of positive charges of the compounds obtained by reacting epoxy compounds on polyamine compounds, the clarifying efficiency can be further improved.

It is preferable that compounds obtained by reacting the epoxy compounds on the polyamine compounds are coated on a cellulosic or cellulose by 10 to 60 wt % to the cellulosic or cellulose. If the amount of the compounds is below 10 wt %, cellulosic or cellulose is resolved by an enzyme of the microorganisms. On the other hand, if the amount of the compounds exceeds 60 wt %, the specific gravity of the clarifying pieces becomes larger, which impedes a smooth circulation flow of the clarifying pieces in the clarifying device 1.

As for the reaction rate between the epoxy compounds and the polyamine compounds, it is preferable to react 20 to 150 wt % of the polyamine compounds on epoxy compounds.

As for the polyamine compounds, polyethyleneimine, polyallylamine, polyvinylamine, or the like, may be preferably used. But the polyamine compounds are not limited to the above.

Commercially available porous cellulosic or cellulose, which is coated by compounds obtained by reacting epoxy compounds and polyamine compounds, is not specifically limited. For example, "AKUASERU BZ-H" (Trademark) made by KABUSHIKI KAISHA BIOMATERIAL, may be used.

In a clarifying device 1 according to the preferred embodiment which includes a casing, at least a part of the casing being made of transparent materials, if porous cellulose or cellulosic is used for the clarifying pieces 4, clarifying efficiency will be further improved because of a superior microorganism carrying performance which is inherent in porous cellulosic. Further, the user can determine a correct timing for changing the clarifying pieces 4 by observing changes of the color of the clarifying pieces 4 through the transparent portion of the casing 5 because the porous cellulosic changes in surface color from its original white color to a red-brown color.

Furthermore, in a clarifying device 1 according to the preferred embodiment which includes a casing, at least a part of the casing 5 being made of transparent materials, if porous cellulose or cellulosic is used as the clarifying piece 4 which is coated by compounds obtained by reacting epoxy compounds on polyamine compounds, in addition to the effect for enabling the user to find the timing for replacing the clarifying pieces 4, clarifying efficiency will be further improved because of the positive charges of the compounds obtained by reacting epoxy compounds on polyamine compounds.

Second embodiment:

A second preferred embodiment according to the present invention will be described as follows.

Figure 8:
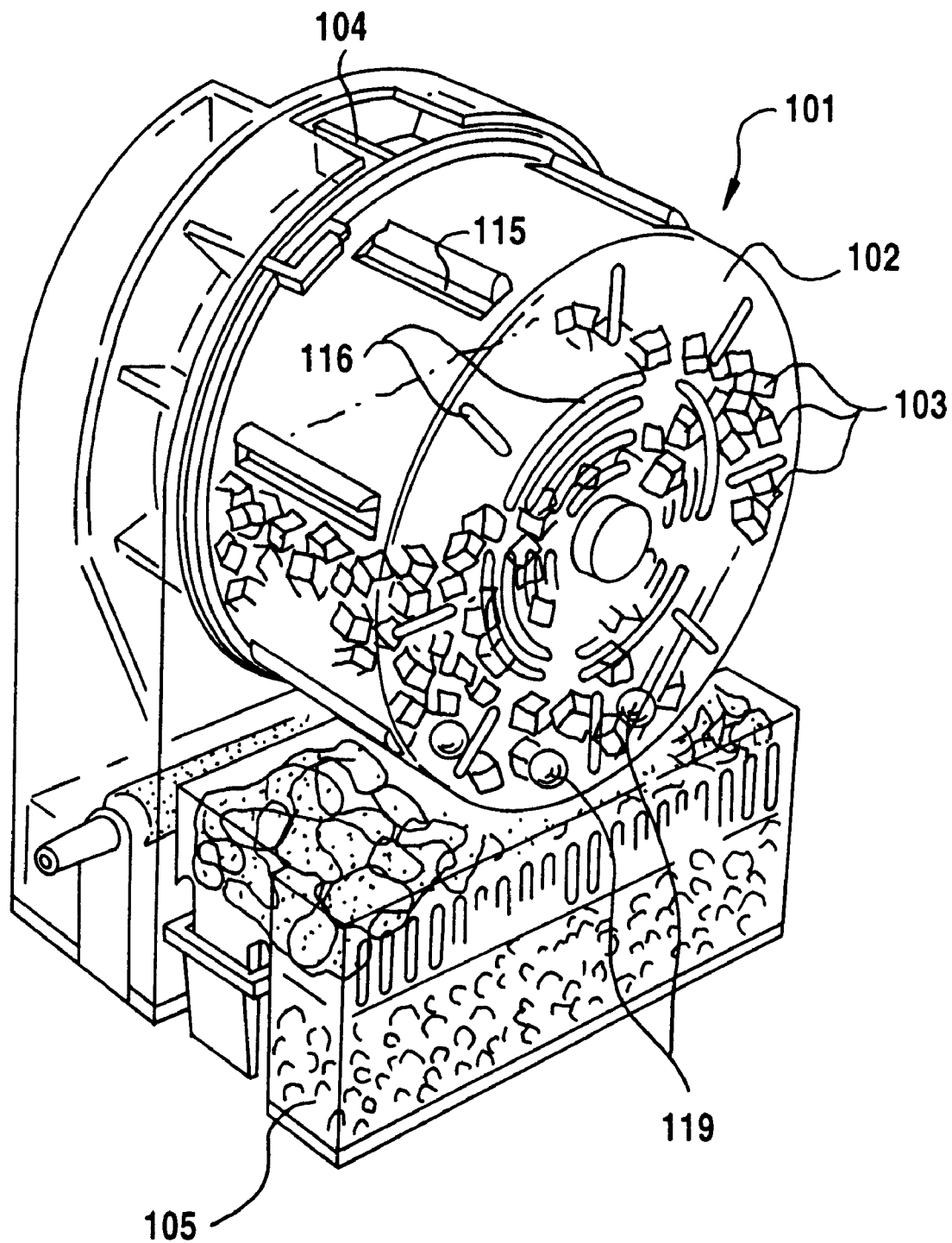

FIG. 8 shows a perspective view of the clarifying device 101 for use in an aquarium according to the present invention. In FIG. 8, reference numerals 102, 103, 104 arid 105 denote a clarifying casing, a clarifying piece, a rotational driving means and a stand, respectively.

Figure 10:
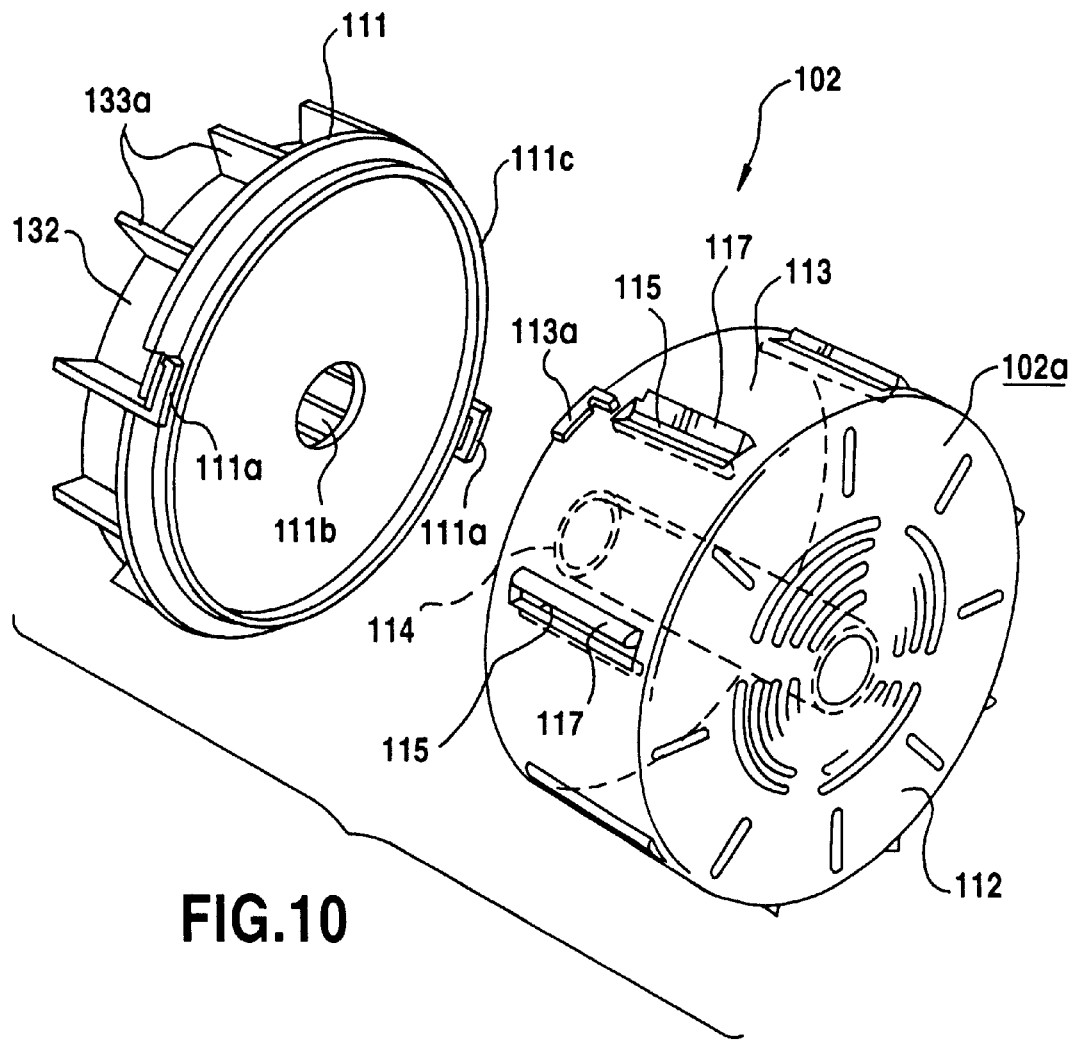

As shown in FIG. 10, the clarifying casing 102 is in a cylindrical form and includes a pair of rear and front side walls 111, 112 and a peripheral wall 113. These walls are made of transparent materials. The front side wall 112 is integrally formed with the peripheral wall 113 to form a main casing 102a. The rear side wall 111 is detachably attached to the peripheral wall 113 of the main casing 102a.

At the inner central portion of the front side wall 112, a hollow axis 114 is location having openings at both ends. On the other hand, at the central portion of the rear side wall 111, a fitting hole 111b for fitting the outer surface of the hollow axis 114 is provided. The rear side wall 111 has, at its inner outer peripheral portion, a circular edge portion 111c which can be fitted in the inner peripheral surface of the peripheral wall 113. A pair of hooking protrusions 113a are formed on a rear outer surface of the peripheral wall 113, and a pair of hooking arms 111a for engaging with the hooking protrusions 113a are formed on the outermost edge portion of the rear side wall 111.

The main casing 102a and the rear side wall 111 are detachably connected as follow. The hollow axis 114 of the main casing 102a is fitted into the fitting hole 111b of the rear side wall 111, and the circular edge portion 111c of the rear side wall 111 is fitted into the inner surface of the peripheral wall 113 to bring the edge of the peripheral wall 113 into contact with the inner surface of the rear side wall 111. Then, the main casing 102a is rotated counterclockwise against the rear side wall 111 to bring the hooking arms 111a into engagement with the hooking protrusions 113a of the peripheral wall 113. Therefore, the clarifying pieces 103 can easily be replaced by rotating the main casing 102a clockwise against the rear side wall 111 and then detaching the rear side wall 111 from the main casing 102a. Because the main casing 102a can be detachably connected to the rear side wall 111, maintenance of the clarifying casing 102 can also easily be done.

Figure 11A:
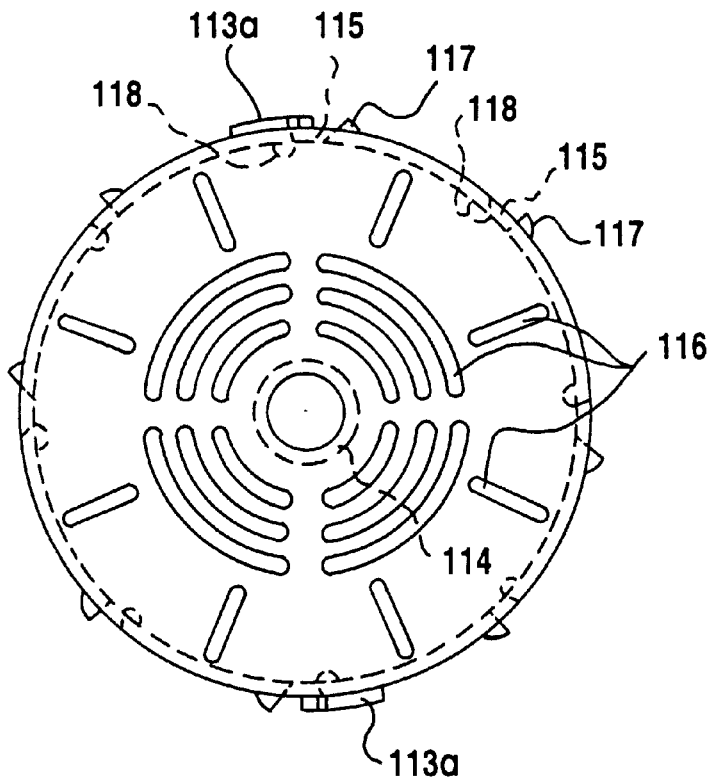
FIG. 11A is a side view of the rotating body.
Figure 11B:
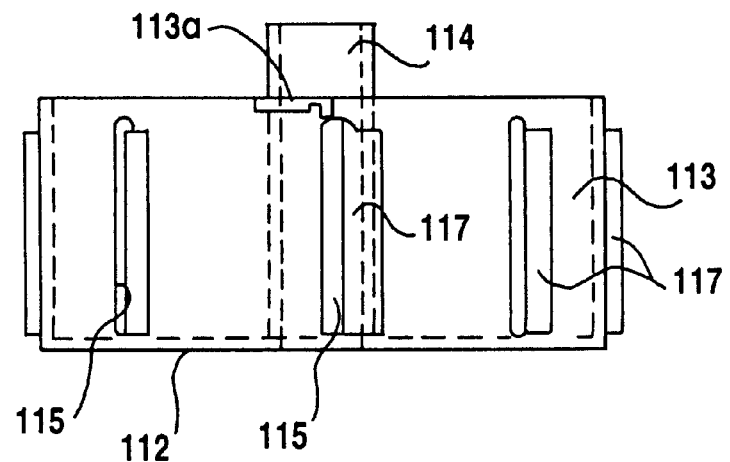
FIG. 11B is a top view showing the rotating body.

As shown in FIGS. 11A and 11B, the peripheral wall 113 is provided with a plurality of water outlet-slits 115 arranged in the peripheral direction of the peripheral wall 113 at certain intervals, each outlet-slit 115 being formed parallel to the hollow axis 114. On the front side wall 112, a plurality of arc-shaped water inlet-slits 116 are formed in three circles, and a plurality of straight-shaped water inlet-slits 116 are radially formed outside the arc-shaped water inlet-slits 116. The width of each water inlet-slit 116 is designed to have a size smaller than the diameter of the clarifying piece 103 so as not to allow the piece 103 to flow out of the clarifying casing 102.

The peripheral wall 113 is provided with a plurality of outwardly protruding ribs 117 each formed along near one edge of each water outlet-slit 115, the edge being located at the forward direction of rotation(i.e., at an edge in front of the outlet-slit in the direction of rotation), and is also provided with a plurality of inwardly protruding ribs 118 each formed along near the other edge of each water outlet-slit 115, the edge being located at the rearward direction of rotation(i.e., at an edge in back of the outlet-slit from the direction of rotation). When the clarifying casing 102 rotates, each outwardly protruding rib 117 generates negative pressure at an outside region near behind the water outlet-slit 115, and each inwardly protruding rib 118 generates positive pressure at an inside region near forward the water outlet-slit 115. This promotes the flow of the clarified water out of the clarifying casing 102 through the water outlet-slits 115, which improves exchange of the aquarium water W in the clarifying casing 102, resulting in a superior clarifying effect.

In the clarifying casing 102, clarifying pieces 1,03 are confined. It is required that the clarifying pieces 103 flow together with water flowing from the water inlet-slit 116 toward the water outlet-slit 115 caused by rotation of the clarifying casing 102. Therefore, the bulk density of the clarifying pieces 103 must fall within the range of from 0.7 to 1.3, more preferably from 0.8 to 1.2. The clarifying pieces 103 carry microorganisms which resolve excretion or leftover foods contained in aquarium water W to clarify the aquarium water W.

The preferable amount of clarifying pieces 103 is from 10 to 90 volume % to the inner volume of clarifying casing 102. If the amount is below 10 volume %, the clarifying efficiency will decrease. On the other hand, if the amount exceeds 90 volume %, the chance of contact of the clarifying pieces 103 becomes larger, which decreases fluidity of the clarifying pieces 103, resulting in a low clarifying efficiency. It is more preferably from 30 to 80 volume %.

Clarifying pieces 103 each having a diameter of from 1 to 8 mm are preferably used. However, the diameter is not limited to the above. The shape of the clarifying piece 103 is not specifically limited, and may be spherical, cubic, rectangular, or any other shape.

In the embodiment of the clarifying device 101, as shown in FIG. 8, a plurality of stirring pieces 119 each having bulk density of more than 1.4 are disposed in the clarifying casing 102. Since the specific gravity of the stirring piece 119 is larger, the movement of the stirring pieces 119 is not so much affected by the water flow in the clarifying casing 102. Thus, the stirring pieces 119 irregularly move in the clarifying casing 102 in accordance with rotation of the casing 102 and repeatedly collide with the clarifying pieces 103. This prevents the clarifying pieces 103 from piling up in the casing 102, thereby resulting in an improved clarifying efficiency.

The stirring pieces 119 are not specifically limited as long as they are 1.4 or more in bulk density and do not dissolve in water. For example, ceramics, metals, hard synthetic resins, minerals, or the like, may be used as the material of the stirring piece 119. The diameter of the stirring piece 119 is preferably about the same as the diameter of the clarifying piece 103. The preferable range is from 1 to 10 mm, but not limited thereto. The shape of the stirring piece 119 is not specifically limited, and may be spherical, cubic, rectangular, or any other shape.

The rotational driving means 104 is not specifically limited as long as it can drive the clarifying casing 1102 to rotate. For example, a rotational motor, an aeration mechanism wheel, a wheel driven by water flow caused by a submersible pump, a forcibly injected water flow, or the like, may be used. The forcibly injected water flow may be a water flow injected toward the outside of the clarifying casing 102 to cause rotation of the casing 102, water flow injected toward the outside of the clarifying casing 102 to contribute the rotation of the casing 102 and the water flow from the water inlet slits 116 toward the water outlet slits 115 in the casing 102, or water flow injected from the axis of the clarifying casing 102 toward a tangent direction to cause water flow in the casing 102 and rotation of the casing 102.

The illustrated rotational driving means 104 comprises a rotor 130, a rotor housing 131 and a fixing pin 138.

Figure 12A:
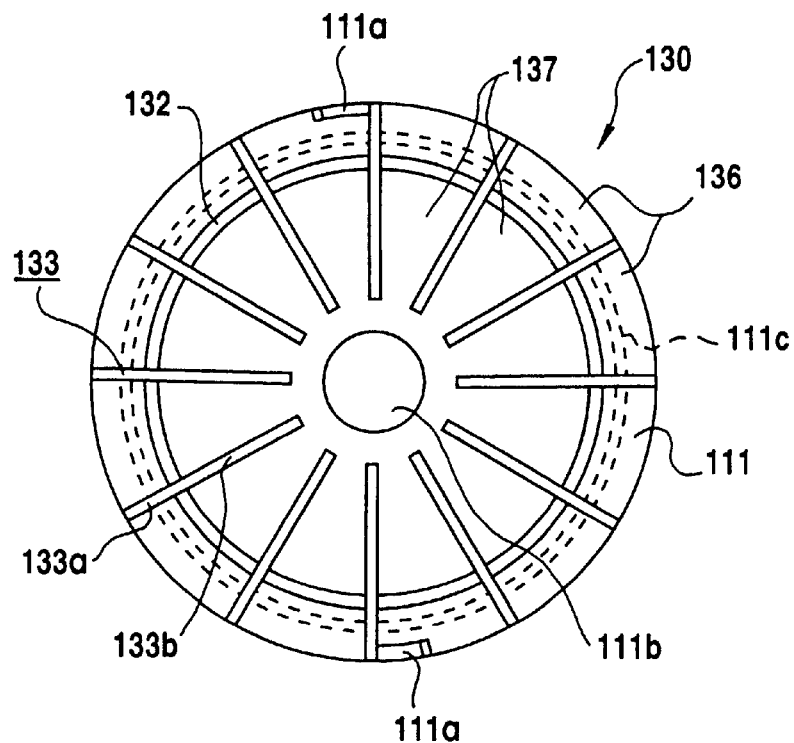
FIG. 12A is a rear view of a rotor of the clarifying device.
Figure 12B:
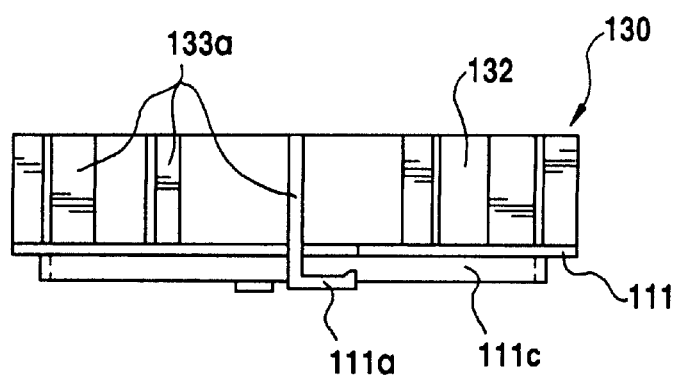
FIG. 12B is a top view of the rotor.

As shown in FIGS. 12A and 12B, the rotor 130 includes the circular side wall 111, the cylindrical wall 132 and a plurality of radially extending wings 133. The circular side wall 111 is the rear side wall of the clarifying casing 102. The circular side wall 111 is, at its radially outer peripheral portion of the outer surface thereof, provided with the cylindrical wall 132, and also is, at its outer surface, provided with the radially extending wings 133 each intersecting the cylindrical wall 132. Each wing 133 includes an outer wing portion 133a and an inner wing portion 133b.

Figure 9:
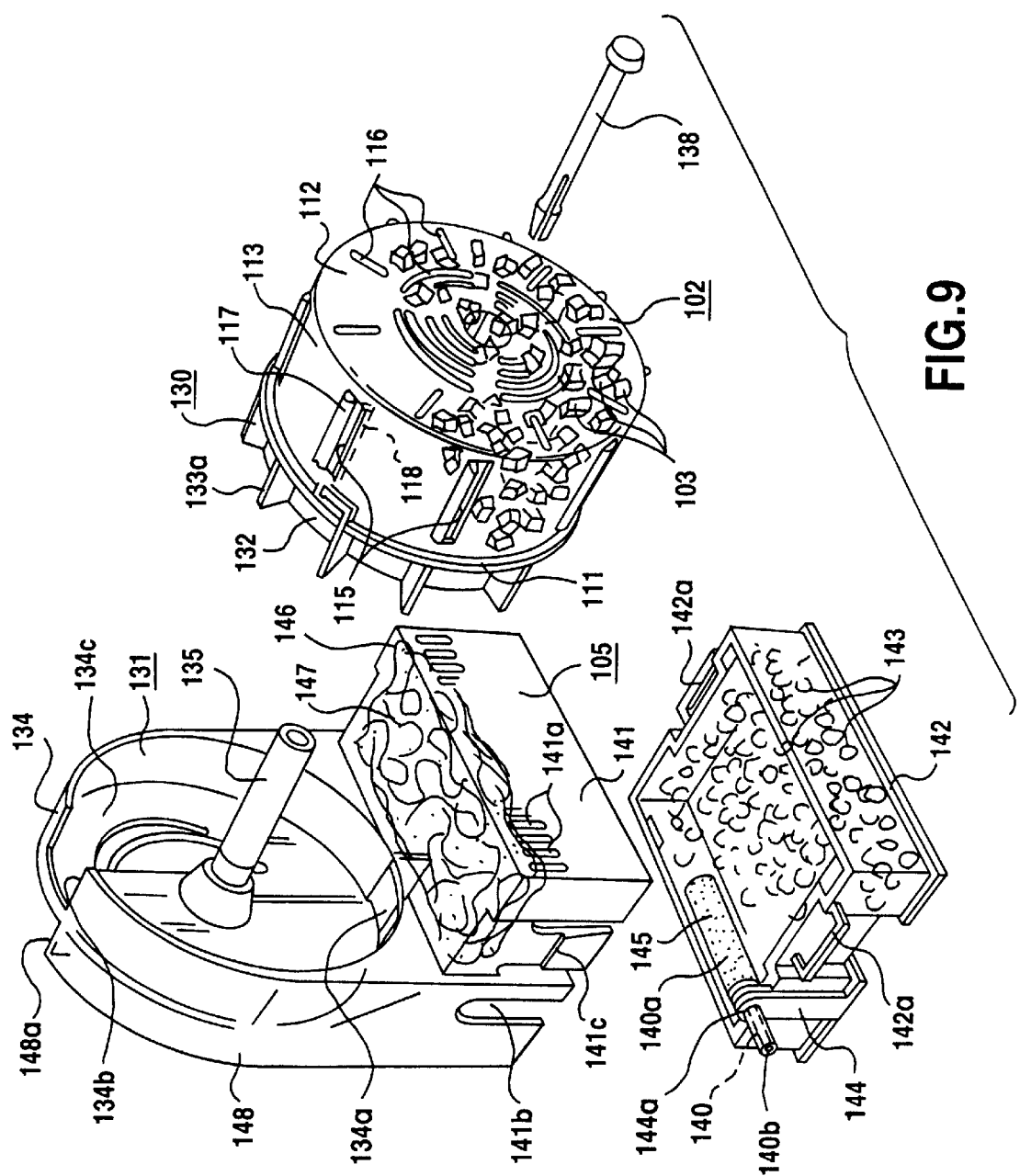

As shown in FIG. 9, the rotor housing 131 includes a rotor covering body 134 and a rotor supporting axis 135. The rotor covering body 134 has a cylindrical opening at one end thereof. The inner diameter of the cylindrical opening is set to become a litter larger than a rotational diameter of the rotor 130. The depth of the cylindrical opening is set to be about the same as that of the rotor 130. The rotor covering body 134 is provided with an air inlet opening 134a for introducing air at a lower portion of the peripheral wall the rotor covering body 134 and an air outlet opening 134b for emitting air at an upper portion of the peripheral wall of the rotor covering body 134.

The rotor supporting axis 135 is formed on the central portion of the side wall 134c of the rotor covering body 134, the axis 135 being a hollow tube having both opening ends. The outer diameter of the rotor supporting axis 135 is designed to be a little smaller than the inner diameter of the hollow axis 114 of the clarifying casing 102.

The lower portion of the rotor housing 131 is connected to a wide-width stand 105 and is stably supported thereby.

Figure 14:
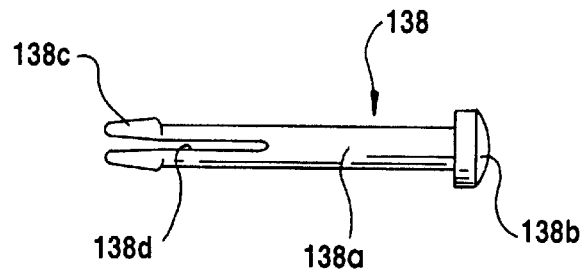

As shown in FIG. 14, the fixing pin 138 includes a shaft portion 138a, a head portion 138b at one end of the shaft portion and a tip portion 138c having an oval-shaped cross-section at the other end of the shaft portion. A slot 138d is formed from the leading end of the tip portion 138c to a middle region of the shaft portion 138a. The outer diameter of the shaft portion 138a is set to be a little smaller than the inner diameter of the rotor supporting axis 135. The diameter of the enlarged tip portion 138c is set to be a little larger than the inner diameter of the rotor supporting axis 135.

The clarifying casing 102 and the rotor 130 can be attached to or detached from the rotor housing 131 as follows. First, the rotor supporting axis 135 is inserted into the hollow axis 114, and then the fixing pin 138 is inserted into the rotor supporting axis 135. When the fixing pin 138 is inserted into the rotor supporting axis 135, the enlarged tip portion 138b is pressed by the inner surface of the rotor supporting axis 135 to thereby reduce the space of the slot 138d. When the enlarged tip portion 138c reaches the enlarged opening 135a of the rotor supporting axis 135, the tip portion 138c is released to its original shape to thereby restore the space of the slot 138d. Thus, the enlarged tip portion 138c of the fixing pin 138 is securely engaged with the enlarged opening 135a of the rotor supporting axis 135. As a result, the clarifying casing 102 and the rotor 130 is rotatably supported by the rotor housing 131.

On the contrary, when the fixing pin 138 is pulled toward the outside, the enlarged tip portion 138c is inserted into the rotor supporting axis 135 from the enlarged opening 135a with the space of the slot 138d reduced. Thus, the fixing pin 138 can be pulled out. Thereafter, the clarifying casing 102 and the rotor 130 can be detached from the rotor housing 131 by pulling them out of the clarifying casing 102.

In the rotor housing 131, as shown in FIG. 12A, the space surrounded by adjacent inner wing portions 133a and the cylindrical wall 132 will be hereinafter referred to as the "inner chamber", and the space surrounded by adjacent outer wing portions 133a and the cylindrical wall 132 will be hereinafter referred to as the "outer chamber".

As shown in FIG. 9, the stand 105 is approximately in a rectangular parallelepiped form, and includes an upper cover 141 and a supporting base 142. The upper cover 141 is approximately in a rectangular parallelepiped form having a lower end opening, and is connected to the rotor housing 131. The supporting base 142 is approximately in a hollow rectangular parallelepiped form having a height of about half the height of the upper cover 141. The upper cover 141 is detachably attached to the supporting base 142 by inserting the supporting base 142 into the upper cover 141.

On the central portions of both end walls of the supporting base 142, an engaging handle 142a having an engaging hole is provided, respectively. On the other hand, on the central portions of both end walls of the upper cover 141, an engaging ledge 141c is provided, respectively. Thus, the upper cover 141 can be locked to the supporting base 142 by fitting the engaging ledges 141c into the engaging holes of the engaging handles 142a.

In the supporting base 142, a plurality of weights 143 each having larger specific gravity are disposed. In this embodiment, pebbles are used for the weights 143.

The supporting base 142 has, at its upper edge portion, an upwardly protruding holding arm 144 having a holding hole 144a, the upper edge portion being located at a lower position of the air inlet opening 134a when the supporting base 142 is inserted into the upper cover 141. Fitted into the holding hole 144a is an air introducing pipe 140 for introducing outside air. The air introducing pipe 140 has an air inlet 140b at one end and an air outlet 140a at the other end. The air inlet 140b will be connected to an air pump, or the like. The air outlet 140a is connected to a porous hollow cylindrical pumice stone 145 having an opened end. The pumice stone 145 is located under the air inlet opening 134a of the rotor housing 131.

When the supporting base 142 is inserted in the upper cover 141, the holding arm 144 is fitted in a corresponding cut-out portion 141b formed on the side wall of the upper cover 141.

The upper cover 141 has, at its upper half portion of a front wall, a plurality of slit-shaped water inlets 141a formed at certain intervals, each extending in the vertical direction. In a filtering space formed between the slit-shaped water inlet 141a and the air inlet opening 134a, physical filtering materials 147 such as nonwoven fabrics, sponges, active carbons, or gravels, are disposed.

Behind the side wall 134c of the rotor housing 131, an upright passage 148 is formed with one end thereof communicating with the filtering space 146 near the air inlet opening 134a and the other end thereof opened to an air emitting opening 148a near the air outlet opening 134b.

Figure 15:
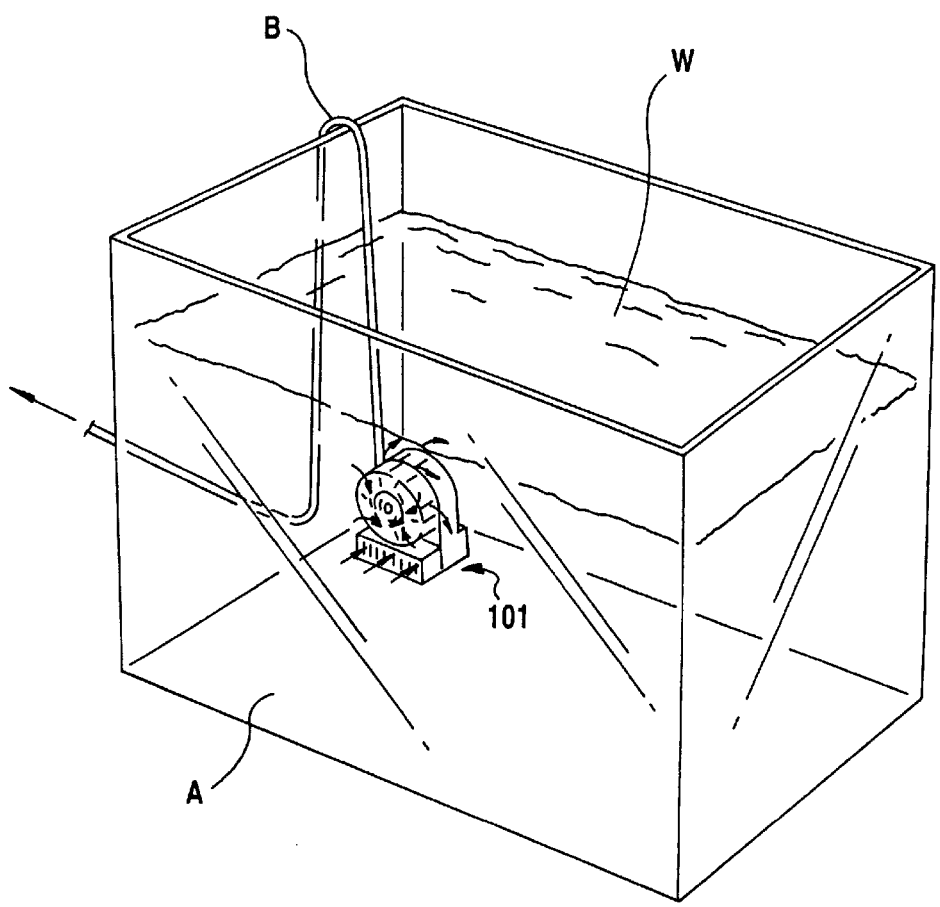
Figure 16:
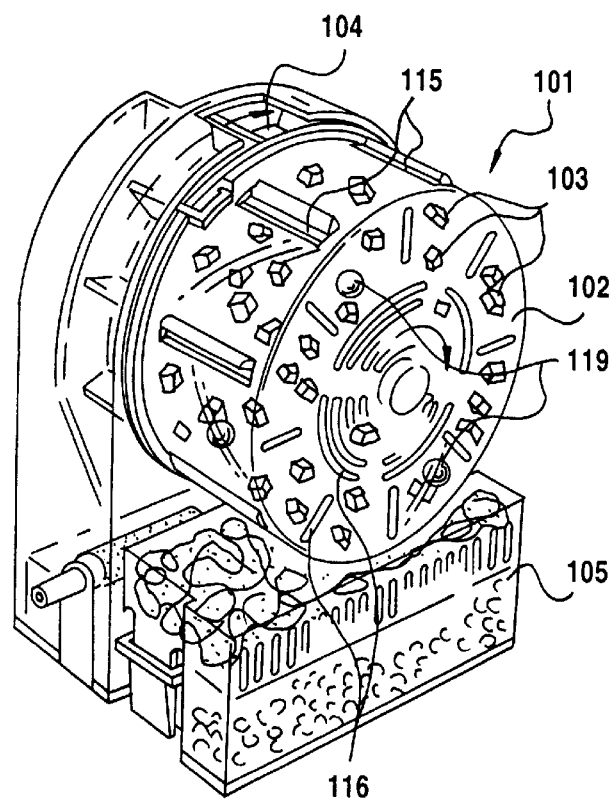
Figure 17:
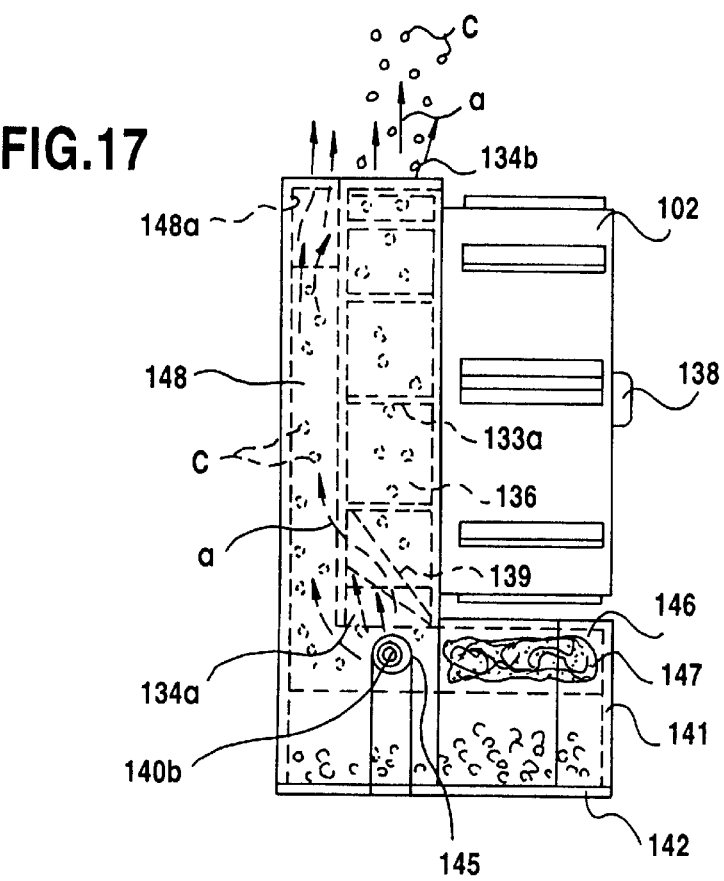

FIG. 15 shows a clarifying device 101 in use in an aquarium. The device 101 is disposed on the bottom of the aquarium A. The air inlet 140b of the air introducing pipe 140 is connected to an air pump (not shown) by a tube 13. As shown in FIG. 17, air C passed through the air introducing pipe 140 turns into small bubbles by the pumice stone 145, and some of them are introduced into the outer chamber 136 formed in the rotor housing 131 through the air inlet opening 134a. The buoyancy of the air C pushes the outer wing portions 133a upward, which in turn rotates the rotor 130, thereby causing a rotation of the clarifying casing 102. Air C is consecutively introduced into the outer chamber 136, which makes the rotation of the clarifying casing 102 constant.

Figure 18A:
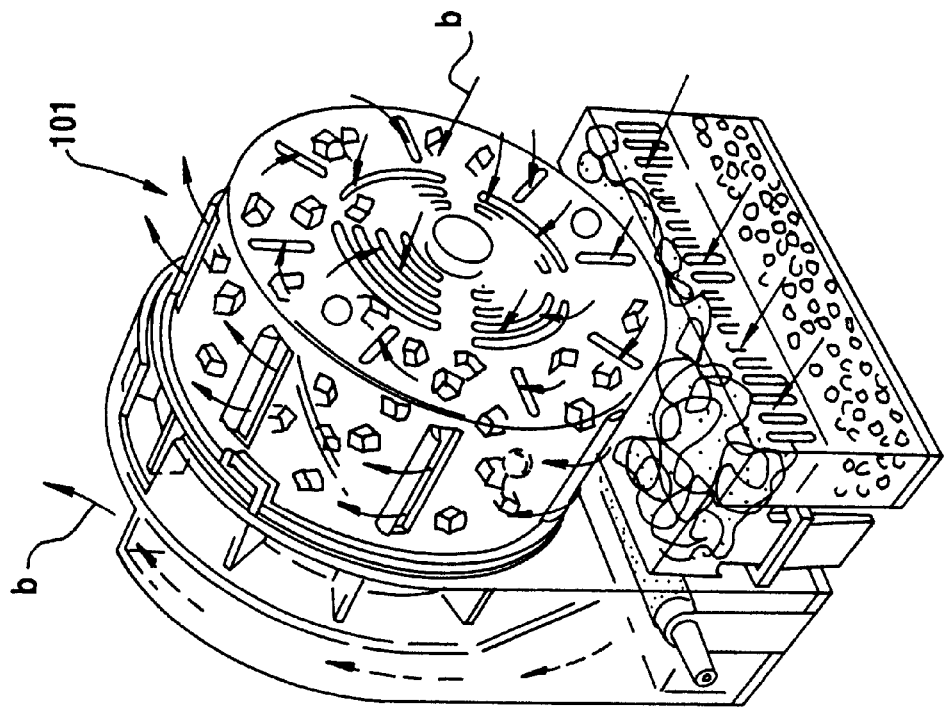
FIG. 18A is a perspective view shown from the rear left upper thereof with an air flow shown in arrows.
Figure 18B:
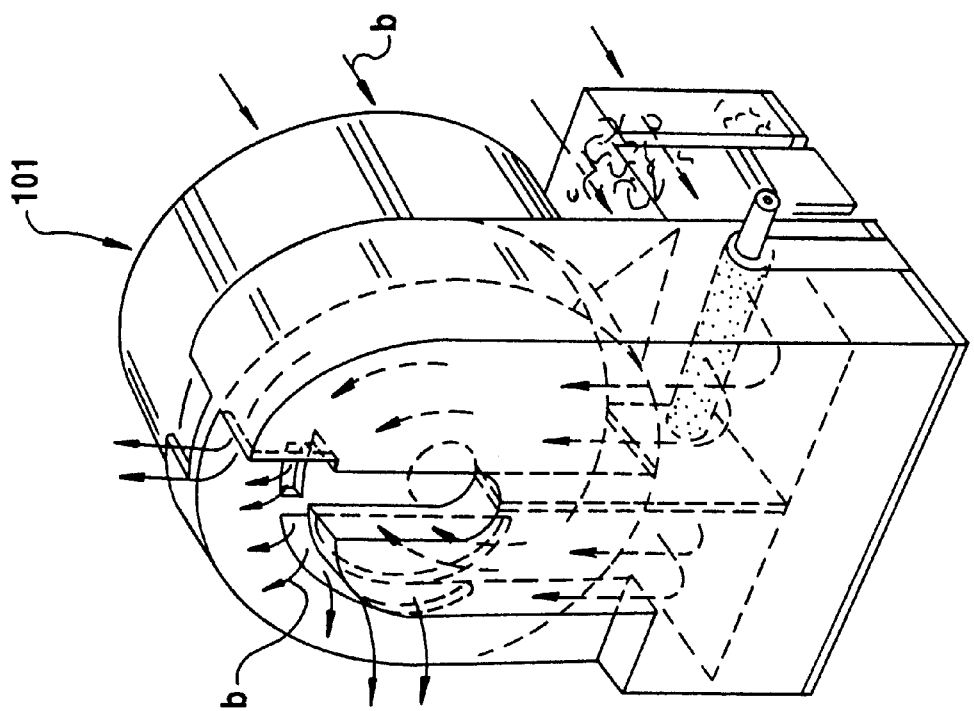
FIG. 18B is a perspective view shown from the front left upper thereof.

In accordance with the rotation of the clarifying casing 102, as shown in FIG. 18B, aquarium water flows into the casing 102 through the water inlet-slits 116 and then flows out of the casing 102 through the water outlet-slits 115. The water flow in the casing 102 causes flow of the clarifying pieces 103, which improves contacting efficiency between the aquarium water W and the clarifying pieces 103, thereby resulting in a sufficient biological clarifying efficiency. Because buoyancy of air C is used as a rotational driving power, air used for the aeration mechanism which supplies oxygen into the aquarium water, can also be used as the rotational driving power, which eliminates an additional driving power, resulting in a low running cost.

As shown in FIG. 17, the rest of the air C emitted from the pumice stone 145 is introduced into the upright passage 148. The air C goes up along the passage 148 by its buoyancy and is then emitted from the air emitting opening 148a into aquarium water. As shown in FIG. 18A, the upward air flow the upright passage 148 causes an upward water flow therein, which in turn introduces the aquarium water W into the filtering space 146 though the slit-shaped water inlets 141a formed on the stand 105. The aquarium water W introduced into the filtering space 146 will be physically filtered by the filtering materials 147 and will then be returned into the aquarium mainly through the air emitting opening 148a.

The upright passage 148 enables buoyancy of air C not only to rotate the clarifying casing 102 but also to introduce the aquarium water W into the filtering space 146, which enables aeration air to simultaneously perform physical filtering of the aquarium water W and biological clarifying of the aquarium water W.

As shown in FIG. 17, above the pumice stone 145 and near the air inlet opening 134a, an inclined wall 139 is provided so as to smoothly introduce air C emitted from the pumice stone 145 into the upright passage 148.

Figure 13A:
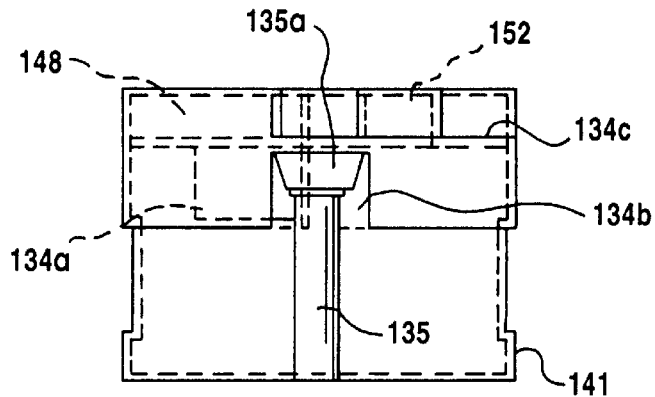
FIG. 13A is a top view of a rotor holding body and an upper half of a supporting base.
Figure 13B:
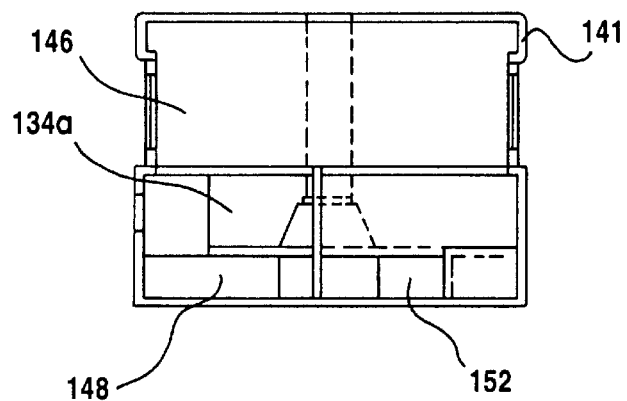
FIG. 13B is a bottom view.
Figure 13C:
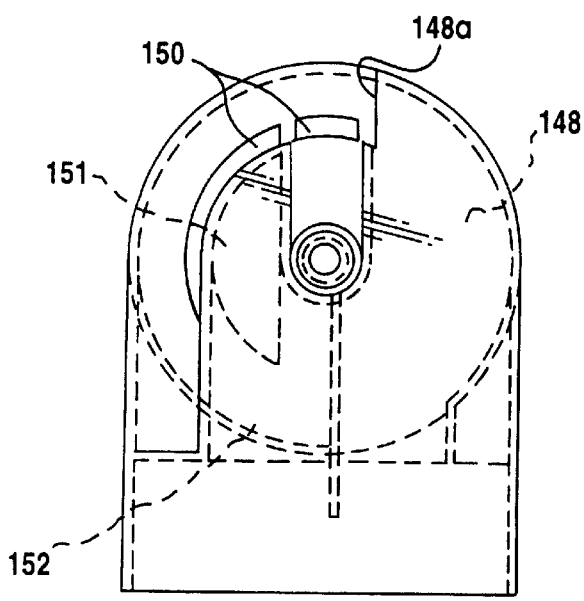
FIG. 13C is a rear view.
Figure 13D:
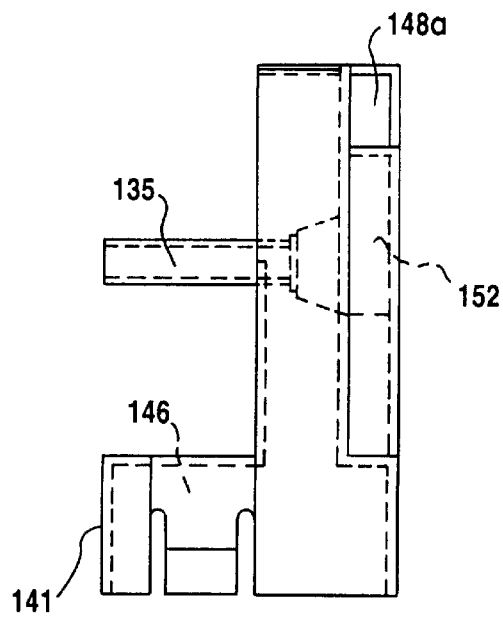
FIG. 13D is a right side view.

In the clarifying device 101 according to the illustrated embodiment, as shown in FIG. 13C, an outlet opening 150 and an inlet opening 151 are formed at a right-half portion of the side wall 134c so as to face the inner chambers 137. The inlet opening 151 is located inside the outlet opening 150. A water flow passage 152 is formed adjacent to the upright passage 148 with one end communicating to the inlet opening 151 and the other end communicating to the filtering space 146.

As shown in FIGS. 18A and 18B, in accordance with the rotation of the rotor 130, the aquarium water W flows from the inlet opening 151 toward the outlet opening 150 by way of the inner chambers 137, which causes aquarium water W to be introduced into the filtering space 146 through the slit-shaped water inlets 141a. This enhances an introduction of the aquarium water W into the filtering space 146, resulting in a superior physical filtering efficiency.

In the clarifying device 101, because aeration air and water containing rich oxygen are prevented from contacting the clarifying pieces 103, the clarifying pieces 103 will carry not only aerobic bacteria but also anaerobic bacteria, resulting in superior clarifying performance.

In the clarifying device 101, interesting movement of the clarifying pieces 103 can be observed through the transparent portion of the clarifying casing 102, which enhances the decorative performance thereof. Further, because the stand 105 is made of transparent materials, the degree of dirtiness can easily be confirmed. Because the rotational driving means 104 and the upright passage 148 are also made of transparent materials, the rotating movement of the rotor 130 and interesting air C flows can be observed, which also enhances the decorative performance thereof.

Other features of the clarifying pieces 103 disclosed in the first embodiment will be incorporated herein.

Though preferred embodiments according to the present invention are described, it should be recognized that various modifications are possible within the scope of the present invention.

This application claims priority to Japanese Patent Application Nos. Hei 9(1997)-44015 and Hei 9(1997)-236230, each disclosure of which is incorporated by reference in its entity.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A clarifying device for use in an aquarium, comprising:
   a casing having at least one transparent portion, said casing including a water inlet for introducing aquarium water and a water outlet for discharging clarified water;
   a plurality of clarifying pieces disposed in said casing; and
   a rotational driving means for rotating said casing,
   wherein said clarifying pieces flow in said casing by water flow from said water inlet toward said water outlet,
   wherein said casing is in a cylindrical form and includes a pair of side walls disposed at a certain distance and a peripheral wall,
   wherein said water inlet is formed on at least one of said side walls and said water outlet is formed on said peripheral wall to cause said water flow in accordance with rotation of said casing, and
   wherein said peripheral wall is provided with a plurality of outwardly protruding ribs each formed along near one edge of each said water outlet, said one edge being located at a forward direction of rotation, and is also provided with a plurality of inwardly protruding ribs each formed along near the other edge of each said water outlet, said the other edge being located at a rearward direction of rotation.

2. The clarifying device for use in an aquarium as recited in claim 1, wherein said water outlet is formed in a shape of slit and parallel to an axial direction of said casing.

3. The clarifying device for use in an aquarium as recited in claim 1, further comprising at least one stirring piece disposed in said casing.

4. The clarifying device for use in an aquarium as recited in claim 1, wherein said rotational driving means includes a rotor having a circular side wall and a plurality of radially extending wings, and a rotor covering body, and
   wherein said rotor covering body is provided with an air inlet opening for introducing air at a lower portion of a peripheral wall of said rotor covering body and an air outlet opening for emitting air at an upper portion of a peripheral wall said rotor covering body, whereby buoyancy of air pushes said outer wing portions upward, which in turn rotates said rotor, causing a rotation of said casing.

5. The clarifying device for use in an aquarium as recited in claim 4, further comprising a stand for supporting said rotor covering body,
   wherein said stand is provided with a water inlet and a filtering space communicating said water inlet with said air inlet opening, and
   wherein physical filtering materials are disposed in said filtering space,
   further comprising an upright passage having two ends, one end communicating with said filtering space near said air inlet opening, the other end opening at a higher portion communicating with said filtering space, an air introducing pipe having two ends, one end opening outside, the other end opening as air emitting apertures at a portion lower than said air inlet opening, whereby air emitted from said air emitting apertures is introduced in said air inlet opening and is also introduced in said upright passage to go up along said upright passage, which in turn introduces aquarium water into said filtering space.

6. The clarifying device for use in an aquarium as recited in claim 5, wherein a plurality of radially extending inner wing portions are formed inside said cylindrical wall,
   wherein an outlet opening and an inlet opening are ire formed on said side wall so as to locate inside said cylindrical wall, and
   wherein a water flow passage is formed adjacent to said upright passage with one end communicating to said inlet opening and the other end communicating to said filtering space.

* * * * *